United States Patent [19]

Peters

[11] 4,413,973
[45] Nov. 8, 1983

[54] EXTRUSION DIE
[75] Inventor: Alan R. Peters, Stratford, Conn.
[73] Assignee: Automation International Corp., Norwalk, Conn.
[21] Appl. No.: 275,210
[22] Filed: Jun. 24, 1981
[51] Int. Cl.[3] .......................... B29F 3/04; B29D 7/02
[52] U.S. Cl. .................................... 425/461; 425/376 B
[58] Field of Search ...................... 17/1 B, 31; 425/97, 425/98, 101, 238–241, 324.1, 328, 190, 192, 194, 325, 327, 224, 363, 377, 378, 379, 381, 461–466, DIG. 235, 380, 465, 378 B; 99/353; 366/71–73

[56] References Cited

U.S. PATENT DOCUMENTS

| 2,413,046 | 12/1946 | Holly | 17/32 |
|---|---|---|---|
| 2,489,951 | 11/1949 | Bump | 425/461 |
| 2,813,301 | 11/1957 | Underwood | 425/376 A |
| 2,892,212 | 6/1959 | Rhodes | 425/327 |
| 2,981,211 | 4/1961 | Emerzian | 425/465 |
| 3,191,228 | 6/1965 | Schluter | 425/461 |
| 3,394,431 | 7/1968 | Nalle | 425/327 |
| 3,602,156 | 8/1971 | Verhoeven | 425/239 |
| 3,731,345 | 5/1973 | Brackman | 17/32 |
| 3,956,056 | 5/1976 | Bogulawski et al. | 425/101 |
| 4,003,688 | 1/1977 | Mueller-Lobeck | 425/380 |
| 4,174,200 | 11/1979 | Hoj | 425/376 B |

FOREIGN PATENT DOCUMENTS

| 1361491 | 4/1964 | France | 264/177 R |
|---|---|---|---|
| 43-24560 | 9/1965 | Japan | 264/177 R |
| 5210900 | 2/1968 | Japan | 425/376 B |
| 51-102050 | 9/1976 | Japan | 425/376 B |
| 602312 | 2/1977 | Switzerland | 425/376 B |

Primary Examiner—Willard E. Hoag
Attorney, Agent, or Firm—William G. Rhines

[57] ABSTRACT

An extrusion die having adjacent the die lips a metering roll characterized by an axial ridge limiting a cavity in the roll surface having a different depth at leading and following edges.

20 Claims, 5 Drawing Figures

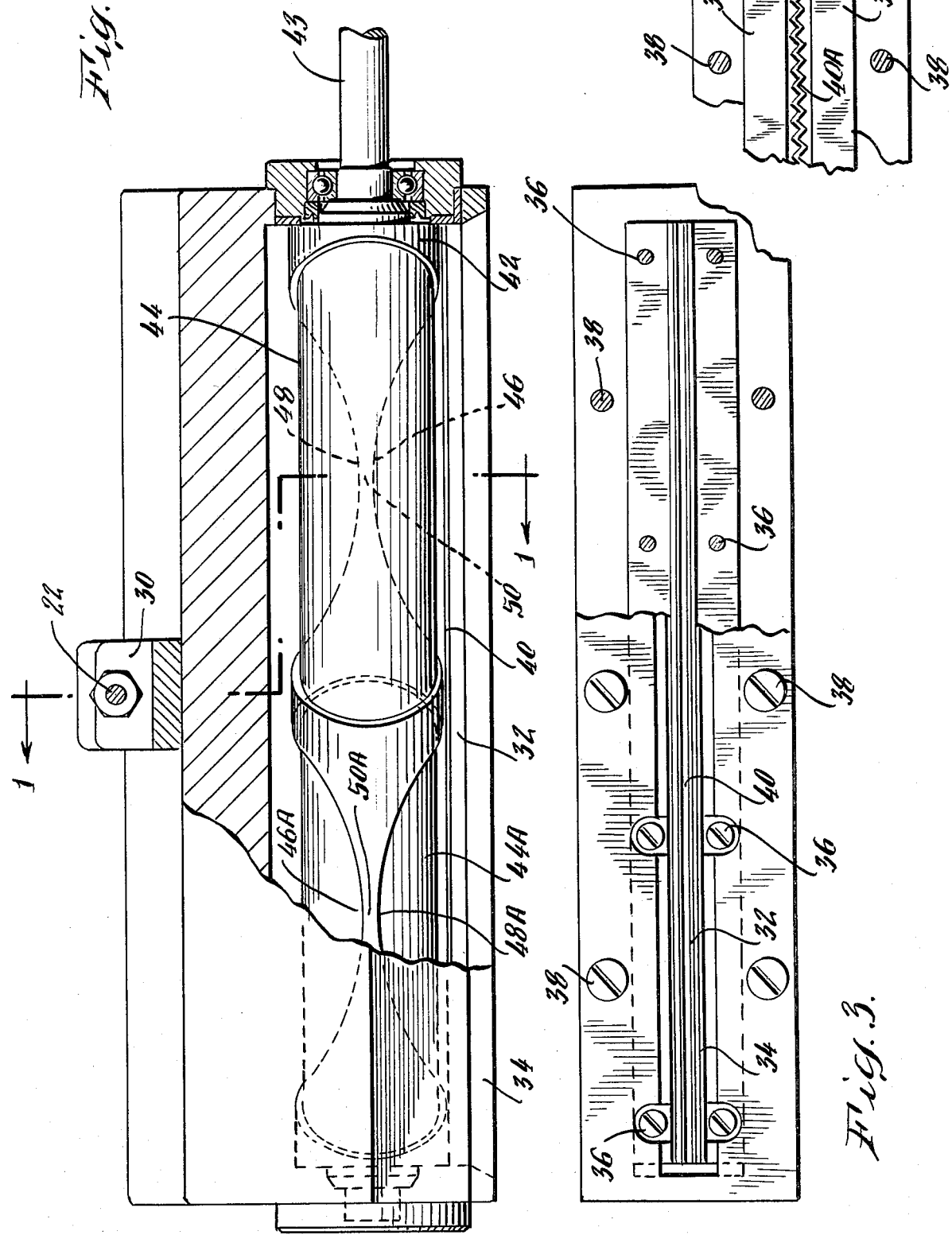

EXTRUSION DIE

BACKGROUND OF INVENTION

Frequently, it is desired to form amorphous masses of material into end products of predetermined shape and thickness, utilizing machinery which affords substantial uniformity, speed and ease. Thus, for example, food products, such as tortillas, may be formed from dough made from corn flour, in the shape of circles of substantially uniform thickness. Traditionally, various methods have been utilized for producing such products, from the hand formation of individual pieces, to die-cutting from flat-rolled sheets. It has also been proposed to extrude dough into such desired shapes, utilizing a slot-like aperture on an extruder in conjunction with an associated cutting valve. The latter may be in the form of a cylinder having a configured portion which remains after removing part of the shell of the cylinder. As the cylinder revolves while positioned in the aperture slot, the amount, dimensions and configuration of the dough which the extruder is permitted to force through the slot may thereby be governed. In this connection, reference is made to Emerzian U.S. Pat. No. 2,981,211. However, in actual practice, it has been found that such devices do not produce products exhibiting the desired degree of uniformity, size and configuration, particularly as attempts are made to increase production speeds and output. For example, it has been found that such devices, designed to produce circular pieces of substantially uniform thickness, tend, particularly as it is attempted to increase the amount of production, to produce items which are more teardrop in shape, with wider leading portions and narrower trailing portions, and with the leading portion thicker than the trailing portion. Without intending to be bound by any theory, it is believed that these undesirable results may be rationalized by considering the various phenomena which are believed to come into play in such operations. First, it will be seen that in such devices designed to produce circular pieces, because of the physical relationship between the retained portions of the cylinder shell and the associated slotted extrusion aperture as the former rolls within the latter, the slot "sees" a gate which opens progressively toward the slot ends from the center, and then reverses the process. Assuming a constant rate of pressure being applied to the dough within the apparatus, it will be seen that the pressure will have built up on the somewhat plastic dough during the time when the extrusion slot is totally covered by the web portion of the cylinder shell. As the web passes the slot and the gate begins to open, the amount of dough extruded through the slot, being a function of the pressure being applied to the dough, will be higher than it is later on in the sequence when the widest part of the cylinder shell has passed the aperture, causing the extruded shape to be thicker and wider because of the comparative excess of dough material being presented. Thereafter, the pressure of the dough may increase somewhat due to the progressive closure of the valve, but not to the level it reaches upon the valve first opening, after having been closed for a time as the web portion passes the extrusion slot. Correspondingly, as the aperture commences closing after passing the widest "open" position, the pressure on the dough then being lowest, the extruded form will tend not to be so thick, or to be filled out as widely in the lateral dimensions. Thus, the conditions are present to produce a final shape which is not of desired uniformity in thickness or in circumferential configuration. Experience shows that such undesired results may be further aggravated where the work product is extruded onto an associated conveyor belt or other transport means to remove the extruded product. Apparently, when such a belt is traveling at a substantially uniform speed, the excess extrusion at the beginning of each cycle is not carried away rapidly enough by the belt, which tends to make the work product "fatter" in thickness and width at the front, but "thinner" in thickness and width at the rear when the belt, although still moving forward at a constant speed, is moving too fast for the volume of extruded material which has by then been decreased. These undesired results have been found to become progressively more severe as it is attempted to increase production with such devices by speeding them up. Again, without intending to be bound by any theory, it is believed this may be due to the necessity, with such attempts to speed-up, to increase correspondingly, the basic extrusion pressure on the dough, with resulting wider ranges in the pressure which the dough exhibits toward extrusion as the valve goes through its successive cycles.

Attempts to use an extrusion aperture in conjunction with a cylinder having a surface depression, to form a forming die (as contrasted with an extrusion cutting valve of the type hereinbefore described) in which the desired shape could be formed and then kept isolated from any subsequent effect of extrusion pressures on the raw material feed, present the technically difficult problem of removing the formed product. In this connection, reference is made to Atkins U.S. Pat. No. 3,541,974. There is illustrated a relatively complex, and therefore inherently more costly and slower, pneumatic stripper for a cylindrical dough die-forming device. Clearly, such apparatus is not satisfactory for high speed, accurate production, for example, in the production of food-products such as tortillas.

Accordingly, an object of the present invention is to provide means to produce desired products from plastic materials in a wide range of thicknesses within desired physical limits.

Another object of this invention is to provide such means to produce such products at a relatively high speed.

Still another object of this invention is to provide means within the contemplation of the foregoing objectives which are relatively simple to produce and operate.

Yet another object of this invention is to provide means within the contemplation of the foregoing objectives which is technically reliable to produce such products with acceptable parameters of dimensional and configurational uniformity.

SUMMARY OF INVENTION

Desired objectives may be achieved through practice of the present invention, embodiments of which include an extruder for material of which plasticity is a characteristic, an associated extrusion aperture, and an extrusion monitor associated with said aperture in the form of a cylinder having a surface depression of circumferential dimensions and shape of the desired end product and varying depth, whereby the dimensions and shape of products produced thereby may be controlled within desired limits.

DESCRIPTION OF PREFERRED DRAWINGS

This invention may be understood from the description which follows and from the appended drawings in which FIG. 1 is a side, cross-sectional view of one embodiment of this invention, FIG. 2 is a sectional view of the embodiment of this invention shown in FIG. 1, FIG. 3 is a plan view of an extrusion plate useful with embodiments of this invention, FIG. 4 is a plan view of a portion of another extrusion plate useful with embodiments of this invention, and FIG. 5 is a side-cross sectional view of another embodiment of this invention.

DESCRIPTION OF PREFERRED EMBODIMENTS

Figure 1:
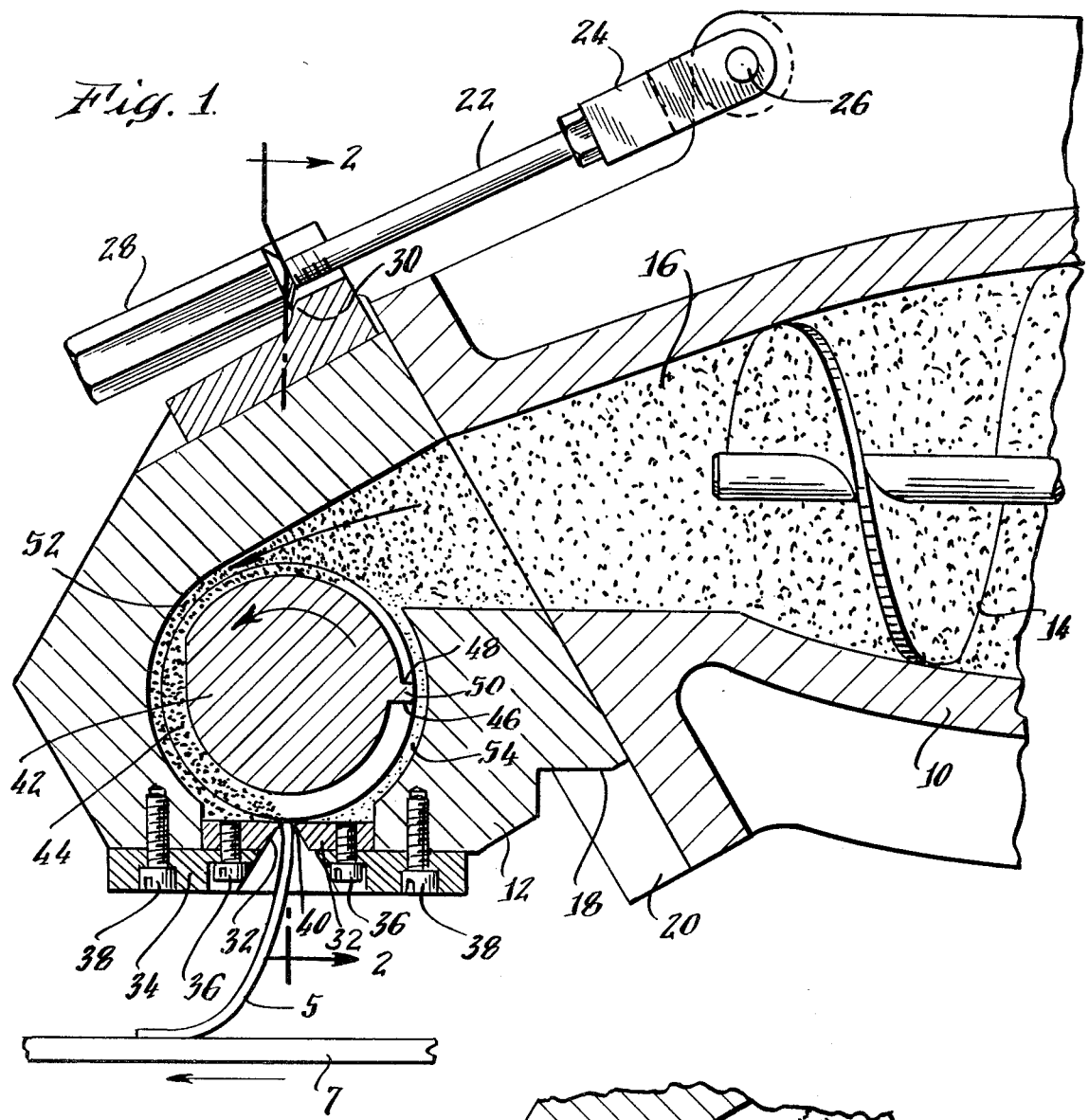

Referring first to FIG. 1, there is depicted a side, cross-sectional view of an embodiment of this invention comprising an extruder 10 and an extruder head 12. The extruder is of known per se design, including a ram screw 14 for imparting ram pressure on the material being extruded. In this case, corn flour dough 16 for making tortillas is illustrated. It is to be understood, however, that embodiments of this invention may be utilized in connection with other materials of which plasticity is a characteristic, such as wheat flour dough, potato flour dough, meats, rubber, plastics, and the like. The extruder head 12 is adapted for removable affixation to the extruder 10 by means of a seat 18 formed by the angled junction between the extruder 10 and seat plate 20. An associated threaded retaining rod 22 is pivotally affixed to the extruder 10 by means of links 24 and a pin 26. The outermost end of rod 22 has a hand-moveable nut 28, by means of which, due to its threaded inter-engagement with the rod 22, the extruder head 12 may be firmly positioned in place against internal extruder pressure as the nut 28 bears on seat 30 after the extruder head 12 is positioned with its lower edge in seat 18. Extrusion from the extruder head is achieved through extruder plate 32, which is affixed to backing plate 34 by means of bolts 36, with the backing plate 34, in turn being affixed to extruder head 12 by means of bolts 38.

Positioned within the extruder head 12, and juxtaposed to the linear extruder aperture 40 in the extruder plate 32, is a monitor roll 42, which is designed, adapted and driven, by shaft means 43 (see FIG. 2) to rotate counterclockwise, in the direction indicated by the arrow. The surface of the roll includes a depression 44, the peripheral configuration of which is substantially of the shape desired for the final product to be produced. Thus, as shown in FIG. 2, the depression is in the form of a circle, wrapped around the outer surface of the cylindrical roll 42. As is shown in FIG. 2, by placing two or more desired configurations, such as circular depression 44A, in tandem axially along the surface of a monitor roll 42, the production potential of a single apparatus may effectively be increased for a single extruder unit. It should be noted that, as shown in FIG. 1, the depth of each depression 44, 44A ... etc., is greater at the edge 46 which first passes the extruder slot 40 as the roll 42 rotates normally, than at the edge 48 which is the last to pass the slot 40 when such rotation occurs. More particularly, as shown in FIG. 1, the depth may be regulated to remain substantially uniform for about one half the circumferential distance from edge 46 to edge 48 and then reduce to the lower depth. This is one operable configuration that has been found useful, for example, to produce tortillas from corn flour dough. Other configurations, in accordance with the teachings of this invention, may also be utilized. Thus, a uniform gradient of depth decease will be found to be satisfactory and useful for many commercial applications. In other applications, such as the production of tortillas, it has been found advantageous to have a more or less uniform decrease in depth for approximately the first half of the circumferential distance of the depression, followed by a substantially uniform depth throughout the remainder. The exact configuration utilized will usually be determined by the relative plasticity of the base material, the extrusion pressure, the amount of "back-pressure" created by the proximity of the roll face to the corresponding wall of the extruder past the extrusion slot, the desired volume, dimensions and configuration of the products being made, and other such factors.

In operation, as the extruder screw 14 turns, the material 16 being extruded (in this case corn flour dough), is forced toward the monitor roll 42 and the extruder slot 40. When the web portion 50 between the edges 46, 48 of the depression 44 is opposite the extruder slot 40, it functions as a valve, prohibiting extrusion from taking place through the slot 40. As the monitor roll 42 rotates counterclockwise in the direction shown, the web 50 passes the slot 40 and, the extrusion pressure on the dough 16 having built up somewhat in the meantime, extrusion of dough through the slot will commence. It will occur in a fairly substantial volume due to the combination of pressure on the dough through the region 52 and comparatively high back-pressure or resistance to plastic flow, due to the close proximity of the flow path walls and the tortuous nature of the flow path, through the region 54. As the roll 42 continues to turn, the flow of dough by extrusion through the slot 40 continues substantially uniformly, because the extrusion pressure and "back-pressure" remain about the same. As the roll 42 continues to turn, the width of the depression 44 facing the opposing wall of the extruder head in the region 52 begins to reduce. The back rim 48 of the depression 44, acts in concert with the closure effect of the opposing wall of the extruder head 12. This, in effect, causes the back rim 48 to function increasingly as an extrusion ram. This effectively results in the dough between the back rim 48 and the extrusion slot becoming under higher pressure, so that the extrusion of dough 16 through the slot 40 is accelerated. This causes the extruded tortilla 5 throughout to maintain its thickness, its lateral configuration and its width substantially uniform within desired limits to that of the front portion of the extruded shape, rather than being narrower and thinner toward the rear of the extrusion as is the tendency with the prior "cutting-valve" devices, as it is delivered to a carrying means to remove it from the machine, such as conveyor belt 7.

Figure 5:
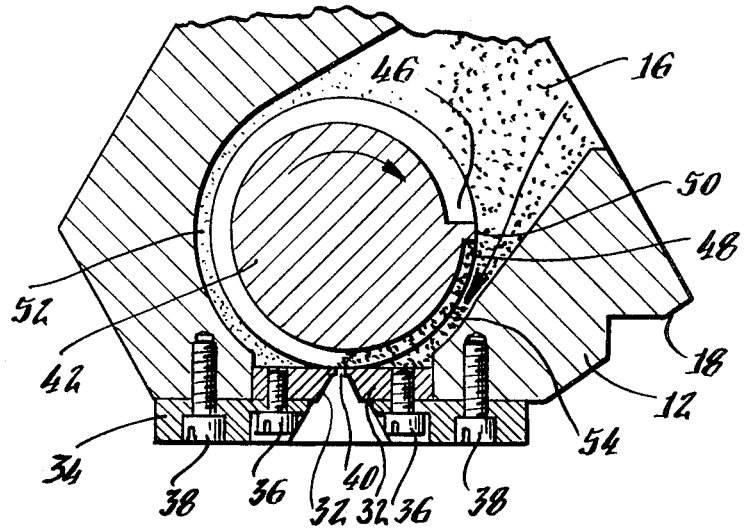

FIG. 5 illustrates another embodiment of this invention. It includes a monitor roll similar to that shown in FIG. 1, designed to operate in the opposite direction. By this means, it is possible to have the extrusion of dough 16 more direct to the extrusion slot 40. Therefore, there will be a higher, or less friction attenuated flow of dough in the direction of the roll as it turns clockwise. As shown, not only is the flow path of the dough shorter and less tortuous, but in addition, optionally a portion of the interior of the extrusion head having been removed in the region 54. At the same time, the close proximity of the face of the roll 42 to the interior contour of the extrusion head in the region 52, and the tortuous path and high resistance to extrusion which that region presents, tends to increase the rate of extrusion through the slot 40. By this means, it is possible to produce products which are thicker and/or wider throughout, and/or are made from more viscose material.

Thus, it will be apparent that by appropriate selection of structural features in accordance with the teachings of this invention, it is possible to vary widely the peripheral configuration and thicknesses which may be produced in accordance with the teachings of this invention. Further, it will be apparent that such wide variations may be produced at significantly higher production speeds. For example, the maximum production of commerical quality tortillas which has been found possible with the prior art devices was about 100 per minute, while production in excess of 200 per minute has been achieved with apparatus in accordance with the present invention. It is believed that in part this may be due to the ram effect of the roll itself. That is, the surface depressions in the roll themselves have a ram extrusion effect, as previously pointed out, which is more localized and immediate to the extrusion aperture and therefore highly effective and efficient in speeding up the rates of extrusion. Further, embodiments of this invention apparently because of this localized ramming effect, tend to be self-cleaning, thus avoiding the necessity of stopping the machine and removing the extrusion components in the event of localized jamming or blockage.

It has also been found that as the web portion 50 of the roll 42 passes the aperture 40, the extruded tortilla 5 tends to stop momentarily until the next extrusion cycle begins. The effect of this is to lay the successive tortillas down on the conveyor 7 with their adjoining edges more or less in very close proximity. Similarly, where more than one axially arrayed surface depression is used in a single roll, the tortilla of one column tend to reside in the interstice between successive tortillas in the next adjacent column on the conveyor. The effect of this is to ensure separation between individual pieces, while at the same time packing them densely, with consequent high efficiency in the utilization of room, machine space, fuel, power, etc.

Typically, corn dough products are from about 1" to about 7" in diameter, with chips generally in the range of about 2"-3" in diameter and about 0.025"-0.055" in thickness, the tortillas generally in the range of about 4.5"-7.0" in diameter and about 0.050"-0.080" in thickness. Corn flour dough products have been successfully produced utilizing the present invention. For example, 6.1" diameter tortillas that are about 0.070" thick have been produced on an embodiment of this invention having the following design parameters:

| | |
|---|---|
| Extrusion ram head pressure at valve = | 40 p.s.i. ± |
| Extrusion plate aperture: | |
| Length = | 12¾" |
| Width = | .070" |
| Roll Specifications: | |
| Diameter = | 2" |
| Length = | 12¾" |
| with two, circular, staggered, axially arrayed surface depressions. | |
| Specifications of Each Surface Depression: | |

| -continued | |
|---|---|
| Diameter = | 6.1" |
| Depth: @ leading edge = | .25" |
| decreasing uniformly to | .1" |
| at about center of depression, then | |
| from center to trailing edge @ | .1" |
| Roll web to extruder wall clearance = | .2" |

FIG. 3 illustrates a bottom plan view of a straight slot extrusion aperture of the sort contemplated to produce flat tortillas of the type heretofore discussed. It should be understood that a feature of this invention is that the aperture, whether of the "straight" configuration shown in FIG. 3, or of any other configuration, including the "crinkle", "zig-zag" or corrugated type shown in FIG. 4, can be made to be adjustable in the width dimension. This may be done by having the holes in the plate 34 through which the bolts 36 pass in the form of elongated slots rather than round holes. By this means, the bolts 36 may be loosened and one or both of the members 32 moved toward or away from each other, thus widening or narrowing the gap to produce a thicker or thinner product. It is also within the contemplation of this invention that the ends of one or both of the members 32 may be moveably affixed to lever arm or other positioning means (not shown), where one or both of the members 32 may be moved and the product thickness therefore modified while the machine continues to operate and without the necessity of adjusting holding screws. This last feature is particularly advantageous in enabling fine adjusting for the effect on thickness of determining variables, such as the plasticity of the dough, extrusion pressure, machine speed, etc.

FIG. 4 illustrates another embodiment, adapted, in this case, for the production of "crinkle", "zig-zag" or corrugated products. Such products might include potato chips, corn chips, or the like. In this connection it should be noted that with such configurations more complex than a straight-line aperture, the extruder pressure, which may normally be in the range of 20-80 p.s.i., usually will become somewhat higher; typically by about 20 p.s.i.

Thus, it is possible to utilize the teachings of the present invention to produce a wide variety of cross-sectional configurations in a wide variety of thicknesses and/or circumferential configurations and/or dimensions, by varying the determinative structural parameters in accordance with the foregoing teachings. It will also be clear that it is possible to produce configurations that are other than arcuate peripherally (e.g., "doughnut" shaped) by varying the shape and configuration of the depression in the surface of the monitoring roll.

Thus, it is to be understood that the embodiments herein shown, discussed and claimed are by way of illustration and not of limitation, and that a wide variety of embodiments may be produced without departing from the spirit or scope of this invention.

I claim:

1. Apparatus for extruding material comprising
a die having an elongated aperture,
a roll juxtaposed to said aperture in closely spaced-apart relationship thereto with the axis of said roll substantially parallel to the long axis of said aperture, said roll having at least one depression in the surface thereof, at least one edge of which is a generally axially oriented leading edge and forms an abrupt ridge with respect to the surface of said roll, the depth of said depression with respect to the circumference of said roll being greater at each point along said leading edge than at the circumferentially corresponding point on the opposite trailing edge of said depression, means for applying pressure to extrudable material to cause it to move past said roll and through said aperture, and means to rotate said roll in the direction such that as said depression moves past said aperture, said leading edge passes said aperture before said trailing edge.

2. The apparatus described in claim 1 wherein said depression is of substantially uniformly decreasing depth from said leading edge to said trailing edge.

3. The apparatus described in claim 1 wherein the portion of said depression from about one-half way from said leading edge to said trailing edge is of substantially uniform depth.

4. The apparatus described in claim 3 wherein the depth of said depression decreases substantially uniformly from said leading edge to about half-way between said leading edge and said trailing edge.

5. The apparatus described in any of claims 1 through 4 wherein the long edges of said aperture are parallel streight lines.

6. The apparatus described in any of claims 1 through 4 integrated into the head of an extruder.

7. The apparatus described in any of claims 1 through 4 integrated into the head of an extruder wherein the long edges of said aperture are parallel straight lines.

8. Apparatus for extruding material into substantially flat shapes from an extruder comprising an extruder head, an extrusion die having an aperture for permitting such material to egress from said extrusion head, said aperture comprising an elongated slot, a roll positioned with its axis substantially parallel to the long axis of said slot and having at least one depression in its surface having a peripheral shape substantially of the peripheral configuration and dimensions of the product to be produced, said roll being positioned in closely spaced apart proximity to said aperture, said depression having a leading edge which is generally axially oriented and forms an abrupt ridge with respect to the surface of said roll, the depth of said depression with respect to the circumference of said roll being greater at each point along said leading edge than at the circumferentially corresponding point on the opposite trailing edge of said depression, means for applying pressure to extrudable material to cause it to move through said extrusion head, and means for causing said roll to turn normally in a pre-determined rotational direction such that as said depression passes said aperture, the portion thereof which first passes said aperture is greater in depth than the portion thereof which is last to pass said aperture.

9. The apparatus described in claim 8 wherein said depression is of substantially uniformly decreasing depth from said leading edge to said trailing edge.

10. The apparatus described in claim 8 wherein the portion of said depression from about one-half way from said leading edge to said trailing edge is of substantially uniform depth.

11. The apparatus described in claim 8 wherein the depth of said depression decreases substantially uniformly from said leading edge to about half-way between said leading edge and said trailing edge.

12. The apparatus described in any of claims 8 through 11 wherein the long edges of said aperture are parallel straight lines.

13. The apparatus described in any of claims 8 through 11 wherein the edges of said aperture described substantially parallel zig-zag lines.

14. The apparatus described in any of claims 8 through 11 wherein the edges of said aperture substantially parallel sinusoidal lines.

15. The apparatus described in any of claims 8 through 11 wherein said depression is substantially circular in peripheral configuration.

16. The apparatus described in any of claims 8 through 11 wherein said depression is substantially circular in peripheral configuration and wherein the edges of said aperture described substantially parallel zig-zag lines.

17. The apparatus described in any of claims 8 through 11 wherein said depression is substantially circular in peripheral configuration and wherein the edges of said aperture substantially parallel sinusoidal lines.

18. The apparatus described in any of claims 8 through 11 wherein the depth of said depression at said leading edge is about 0.25 inches, and at said trailing edge is about 0.1 inches.

19. The apparatus described in any of claims 8 through 11 including means for regulating the spacing between the long edges of said aperture.

20. The apparatus described in any of claims 8 through 11 including means for regulating the spacing between the long edges of said aperture which is operable when said device is in use.

* * * * *